Oct. 1, 1968   R. BERNIER   3,403,930
DEVICE FOR SELF-LOCKING AND QUICK-UNLOCKING OF TWO
PARTS, MORE PARTICULARLY OF ELECTRICAL CONNECTORS
Filed Nov. 29, 1965   3 Sheets-Sheet 1
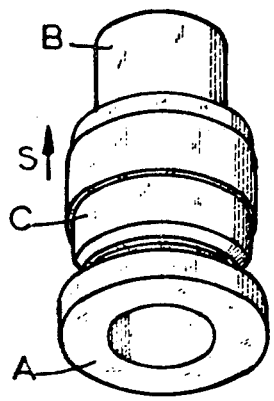
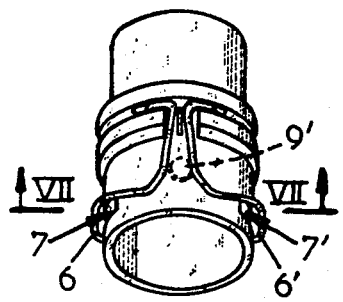
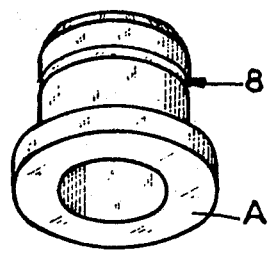
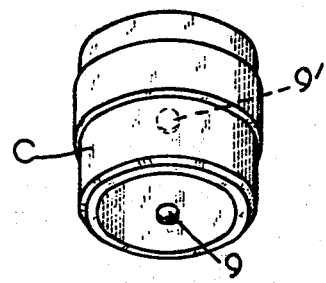
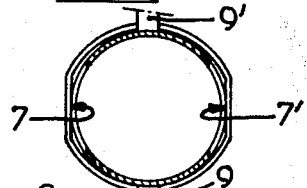
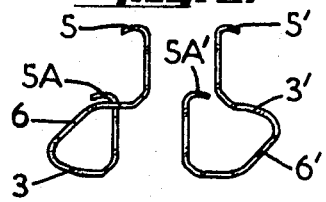
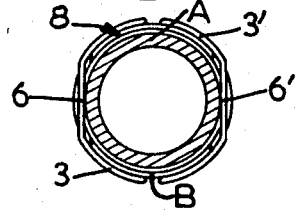

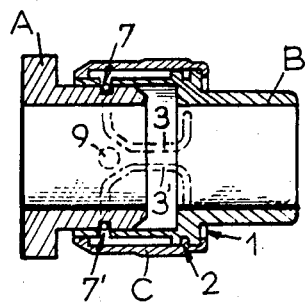
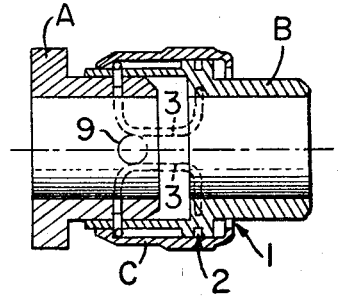
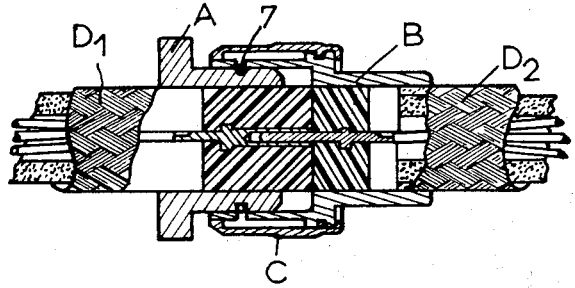

Oct. 1, 1968   R. BERNIER   3,403,930
DEVICE FOR SELF-LOCKING AND QUICK-UNLOCKING OF TWO
PARTS, MORE PARTICULARLY OF ELECTRICAL CONNECTORS
Filed Nov. 29, 1965   3 Sheets-Sheet 3
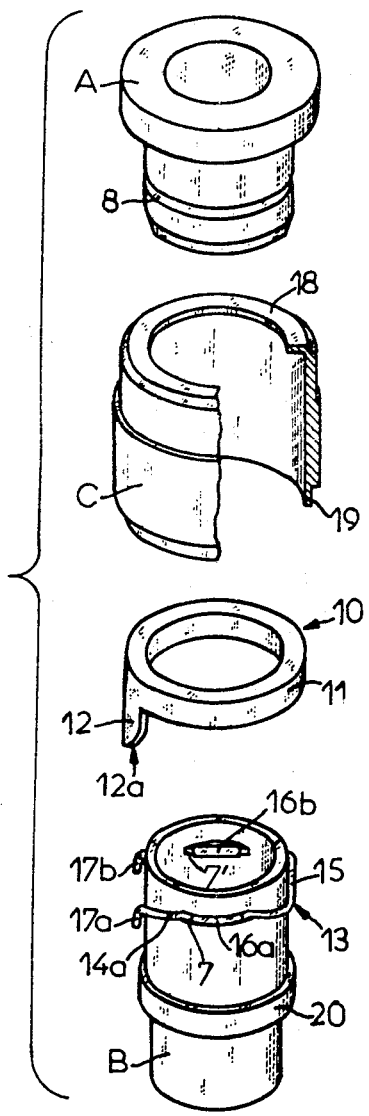
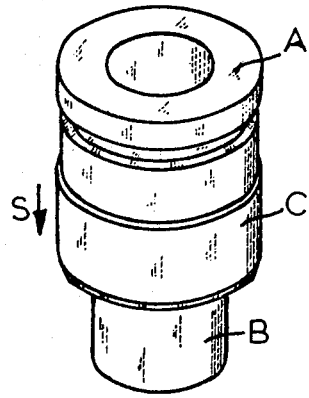
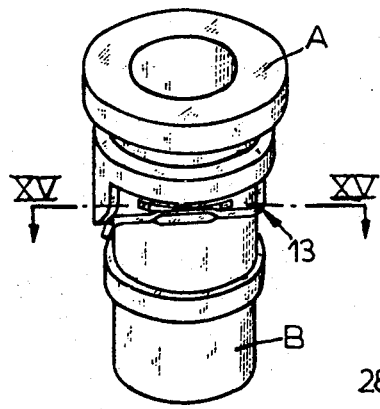
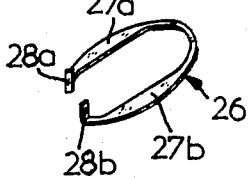
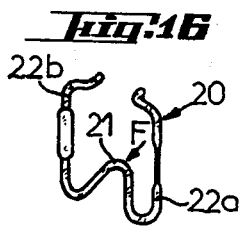
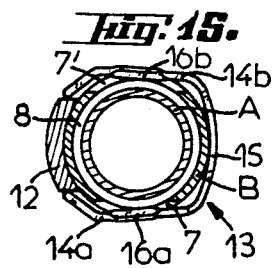

United States Patent Office

3,403,930
Patented Oct. 1, 1968

3,403,930
DEVICE FOR SELF-LOCKING AND QUICK-UNLOCKING OF TWO PARTS, MORE PARTICULARLY OF ELECTRICAL CONNECTORS
Raymond Bernier, Paris, France, assignor to Societe de Constructions Electriques Jupiter, a body corporate of France
Filed Nov. 29, 1965, Ser. No. 510,322
Claims priority, application France, Nov. 28, 1964, 996,733; Jan. 5, 1965, 920
2 Claims. (Cl. 285—315)

ABSTRACT OF THE DISCLOSURE

Self-locking device comprising a spigot having an outer groove, a socket having a slot, a U-shaped clip encircling the socket and secured to the same, the groove and the slot being simultaneously engageable by the intermediate leg of the clip and a slidable unlocking member for deflecting the clip and causing its intermediate leg to disengage said groove and said slot.

---

The present invention essentially relates to a device for self-locking and quick-unlocking of two parts, in particular of an electrical connector, of the type comprising a spigot and a socket, preferably both cylindrical in shape.

Such a device should be enabled to be unlocked when attractive force is exerted upon the one or the other part, but should be unlocked by the action of a suitable unlocking member.

Electrical connections of this kind are already known, but they are relatively complicated and their manufacture requires a very costly precision work. Disregarding this, these devices cannot be applied, for an acceptable price, to multipolar spigot-and-socket assemblies the external diameter of which is relatively large as is the case for example for three-phase spigot-and-socket assemblies having a ground conductor, etc.

The device according to the invention is characterized in that it comprises at least one resilient clip encircling at least partially the socket member, said clip preferably having the shape of a U the ends of the parallel legs of which are secured to said socket element and the intermediate leg of which forms a keeper portion, a circular groove provided on the surface of the spigot element, at least one slot formed in the socket element and an unlocking member slidably mounted on the socket element and provided with means for engaging at least one of the legs of said clip and causing deflection thereof, the spigot element and the socket element being locked when the keeper portion simultaneously engages said groove and at least one of said slots and being unlocked when the sliding motion of the unlocking member, by causing the deflection of the keeper portion, disengages the latter from the groove.

According to another feature of the invention, the device comprises an independent deflection member, movably mounted on the socket element and adapted to spread apart from each other the legs of the yieldable clip, said deflection member being controlled when moving by the unlocking member.

According to another feature of the invention, said deflection member consists of an annular member slidably mounted on the socket element, in coaxial relationship with the latter, said unlocking member capping said annular member so as to carry it along in translation therewith.

The use of a sliding annular member separate from the unlocking member, for causing the deflection of the legs of the locking clip, is advantageous in that it simplifies the construction of the device as well as its mounting and therefore results in a decrease of the cost price.

According to another feature of the invention, said annular member comprises at least one cam element or the like the end of which, preferably having a semi-circular shape, is adapted to be inserted between the parallel legs of the resilient clip and to spread them apart from each other.

The spreading of the legs of the clip is obtained in view of the action of the cam element, the shape and size of which cam element may be selected to secure unlocking in the best possible conditions.

Other features of the invention will become apparent as the following description proceeds.

In the accompanying drawings, which are given only by way of example:
FIGURE 1 is a perspective view of the device according to the invention in the locked position;
FIGURE 2 is a perspective view of the device of FIGURE 1, the unlocking ring being assumed to have been removed;
FIGURE 3 shows the plug element of the device of FIGURE 1;
FIGURE 4 shows the socket element of the device of FIGURE 1, provided with the locking clip;
FIGURE 5 shows a perspective view of the locking clip;
FIGURE 6 is a section taken along the line VI—VI of FIGURE 2;
FIGURE 7 is the section taken along the line VII—VII of FIGURE 4;
FIGURE 8 is the longitudinal section through the device illustrated by FIGURE 1, said device being in the locked position;
FIGURE 9 is the longitudinal section through the device illustrated by FIGURE 1, said device being in the unlocked position;
FIGURE 10 is a longitudinal section through a locking device according to the invention, applied to an electrical connector;
FIGURE 11 is a perspective view of the unlocking member;
FIGURE 12 is a perspective view of a device according to a third modification, its component elements being assumed to be separated from each other;
FIGURE 13 is a perspective view of the device of FIGURE 12 in the connecting position;
FIGURE 14 is a perspective view of the device of FIGURES 12 and 13, both plug-and-socket elements being connected, but the unlocking ring being removed;
FIGURE 15 is a sectional view taken along the line XV—XV of FIGURE 14;
FIGURE 16 is a perspective view of a resilient clip according to an alternative embodiment;
FIGURE 17 is a modification of the cam adapted to co-operate with the clip of FIGURE 16;
FIGURE 18 is a perspective view of another modification of said clip.

FIGURES 1 to 11 show by way of not limiting example two cylindrical hollow parts A and B provided with self-locking and quick unlocking devices according to the invention. The end of the socket element B, having the shape of a cylindrical hollow member, is formed with two slots 7, 7′ (FIGURES 4 and 7) which are engaged by the keeper portions 6, 6′ forming the central portion of the resilient clips 3, 3′ which are preferably U-shaped, the ends of their parallel legs 5, 5′ being secured by any known means on the surface of the socket element, for example by bending said ends and by inserting them, by means of the notches 4, 4′, into the circular groove 2 of the collar 1 integral with part B.

In the locked position, shown in FIGURES 2, 6 and 8, the keeper portions 6, 6′ engage the circular groove 8 provided in the surface of the spigot element A. The temporary fastening together of members A and B is thereby obtained.

To unlock the spigot element A from the socket element B, there is provided a ring C, mounted coaxially with the socket element B and which is displaceable in the direction of the arrow S (FIGURE 1); within the latter are provided snug spigots 9, 9' (FIGURE 11) adapted to be inserted between both substantially parallel legs of the resilient clips 3, 3' (FIGURE 4) and to thereby free, through deflection of these latter, the keeper portions 6, 6' from their engagement with the groove 8 as it may be also seen on FIGURES 6 and 7 and on FIGURES 8 and 9 showing both spigot-and-socket elements A, B in section, in the locked position (FIGURES 6 and 8) and in the unlocked position (FIGURES 7 and 9).

The connection and automatic locking of the plug element A with the socket element B is effected by inserting the plug element A into the socket element B; at this time, the keeper portions 6, 6' located within the slots 7, 7' and integral with the resilient clips 3, 3' engage the groove 8.

To disconnect the elements, it is necessary to act upon the ring C in the direction of the arrow S (FIGURE 1), the cam elements 9, 9' causing the deflection of the clips 3, 3' thereby disengaging the keeper portions 6, 6' from the groove 8.

Obviously it is possible to provide one or several clips 3 on the surface of the element B and according to the external diameter of the latter.

It is also possible, without departing from the scope of the present invention, to make the member A in the form of a stationary electrical connector element, more particularly adapted for polyphase currents and integral with an electric cable $D_1$, and the member B in the form of a movable or portable connector element integral with an electric conductor cable $D_2$.

The embodiment shown in FIGURES 12 and 15 comprises, in addition to the plug-and-socket elements A and B respectively and the unlocking ring C, a deflecting member consisting of an annular member 10. This annular member 10 comprises a ring element 11 and a nose or cam element 12 the lower edge 12a of which has a substantially semicircular shape.

The locking member consists of a resilient clip 13 having the general shape of a U and formed with two substantially parallel side legs 14a and 14b joined by a transverse leg 15. Each side leg 14a, 14b is formed in its central portion with a flattened portion 16a, 16b which engages the grooves 7 and 7' of the socket element B and comprises at its end a bent portion 17a, 17b.

The ring element 11 of the annular member 10 has an inner diameter slightly above the outer diameter of the socket element B so that it may freely fit and slide on this latter.

To mount or assemble the device, it is sufficient to fit at first the annular member 10 on the socket element B by placing the cam element 12 in registering relationship with the spacing between the bent ends 17a and 17b of the clip 13, then to mount the ring C which retains and may carry along said annular member owing to its upper shoulder or flange 18. Thereafter, the inner edge 19 of the ring C is turned over inwards whereby said ring is thus retained upon the socket element B by the collar 20 provided on said socket element B.

To connect the plug-and-socket elements A and B, it suffices to insert the plug element A into the inside of the socket element B until the flattened portions 16a and 16b fit into the groove 8 of the spigot element A. Both spigot-and-socket elements are then locked to each other.

For the unlocking operation, the ring C is slidably moved in the direction of the arrow S (see FIGURE 13) thereby carrying along in the same direction the annular member 10, the cam element 12 of which spreads apart the legs 14a and 14b of the clip 13, in view of its rounded lower edge 12a, so that the flattened portions 16a, 16b are disengaged from the groove 8 and therefore free the plug element A.

It must be pointed out that the orientation of the flattened portions 16a and 16b promotes the engagement with the plug element A when the clip 13 is positioned on the socket element B.

It must also be pointed out that the lower portion of the cam element 12, instead of having a rounded profile has shown, may be given a profile of a different shape selected according to the shape chosen for the end of the parallel legs of the clip 13, which shape may be different from that shown in the drawings.

In FIGURE 16, there is shown a clip 20 the transverse leg of which is formed with a loop or bow 21 located in a plane substantially at right angles to the plane defined by the two parallel legs 22a and 22b. It is seen that when the clip is mounted on the socket element B and a pressure is exerted upon the loop 21 in the direction of the arrow F, the legs 22a and 22b are spread apart from each other.

With the clip of FIGURE 16 is therefore associated an annular member 23 (see FIGURE 17) which is formed with two diametrically opposite cam elements 24 and 25 instead of being formed with a single cam element, one of these cam elements being adapted to be engaged between the legs 22a and 22b whereas the other one exerts a pressure upon the loop 21. Both cam elements thus simultaneously cause the spreading apart of the legs 22a and 22b of the clip 20, hence the unlocking of the device.

On FIGURE 18 has been shown a clip 26 according to another embodiment, made by cutting out a flat spring leaf. This clip has substantially an arcuate shape and comprises two side legs 27a, 27b which are adapted to engage the slots 7, 7' of the socket element B and the groove 8 of the spigot element A; it is formed at its ends with two fingers 28a and 28b adapted to co-operate with the cam element 12 of the aforesaid annular member.

It will be understood that the invention should be construed as not being limited to the embodiments herein described and shown which have been given only by way of example, but that its scope is defined by the appended claims.

What is claimed is:

1. A device for self-locking and quick-unlocking of two members, comprising a substantially cylindrical spigot element having an outer circumferential surface and a substantially cylindrical socket element, said spigot element being telescopically received in said socket element each, said spigot and socket element having a longitudinally directed axis, at least one resilient clip encircling at least partially said socket element, said clip having substantially the shape of a U formed with a pair of substantially parallel legs joined by an intermediate leg portion, said parallel legs being parallel to the longitudinal axis of said spigot and socket elements, the ends of said parallel legs being secured to the outer circumferential surface of said socket element and said intermediate leg portion forming a keeper portion; a circular groove formed on the surface of said spigot element, at least one slot formed through a portion of the socket element, said intermediate leg portion positioned in said slot and engaging said groove on said spigot element, and an unlocking member longitudinally slidably mounted on said socket element and provided with means for engaging at least one of said parallel legs of said clip and for causing deflection thereof, said spigot element and said socket element being locked to each other when said keeper portion simultaneously engages said groove and at least one of said slot, and being unlocked when the longitudinally sliding movement of said unlocking member causes said intermediate leg portion to be disengaged from said groove upon causing the deflection of said intermediate leg portion.

2. A device according to claim 1 wherein said unlocking member consists of a ring disposed in co-axial relation to the longitudinal axis of said socket element and formed within its hollow portion with at least one cam element adapted to cause the deflection of said resilient clip.

References Cited

UNITED STATES PATENTS

| | | | |
|---|---|---|---|
| 239,827 | 4/1881 | Newman | 285—321 X |
| 574,236 | 12/1896 | Blackburn | 285—320 X |
| 874,378 | 12/1907 | Allen | 285—241 X |
| 2,004,967 | 6/1935 | Williams | 285—317 X |
| 2,363,436 | 11/1944 | Pancoe | 85—8.8 |
| 2,526,791 | 10/1950 | Wroblewski | 24—218 X |
| 2,805,089 | 9/1957 | Hansen | 285—321 X |
| 3,032,229 | 5/1962 | Schoepe et al. | |
| 3,314,696 | 4/1967 | Ferguson et al. | 24—218 X |

CARL W. TOMLIN, *Primary Examiner.*

D. W. AROLA, *Assistant Examiner.*